United States Patent
Yudanov et al.

(10) Patent No.: US 9,103,912 B2
(45) Date of Patent: *Aug. 11, 2015

(54) INTER-CHANNEL BIAS CALIBRATION FOR NAVIGATION SATELLITE SYSTEMS

(75) Inventors: Sergey Yudanov, Moscow (RU);
Vyacheslav Varyukhin, Moscow (RU);
Nikolay Shurygin, Moscow (RU);
Javad Ashjaee, Saratoga, CA (US)

(73) Assignee: Javad GNSS, Inc., San Jose, CA (US)

( * ) Notice: Subject to any disclaimer, the term of this patent is extended or adjusted under 35 U.S.C. 154(b) by 858 days.

This patent is subject to a terminal disclaimer.

(21) Appl. No.: 13/237,658

(22) Filed: Sep. 20, 2011

(65) Prior Publication Data

US 2012/0242542 A1    Sep. 27, 2012

Related U.S. Application Data (63) Continuation-in-part of application No. 13/234,034, filed on Sep. 15, 2011, now abandoned, which is a continuation of application No. 12/347,218, filed on Dec. 31, 2008, now Pat. No. 8,022,868.

(51) Int. Cl.
*G01S 19/23* (2010.01)
*G01S 19/33* (2010.01)

(52) U.S. Cl.
CPC *G01S 19/33* (2013.01); *G01S 19/23* (2013.01)

(58) Field of Classification Search
USPC ........................................ 342/357.62, 357.73
IPC .......................................... G01S 19/235,19/33
See application file for complete search history.

(56) References Cited

U.S. PATENT DOCUMENTS

| 6,091,358 | A | 7/2000 | Maniscalco et al. |
| 6,107,960 | A | 8/2000 | Krasner |
| 6,266,007 | B1 | 7/2001 | Lennen |
| 6,363,123 | B1 | 3/2002 | Balodis |
| 6,608,998 | B1 | 8/2003 | Neumann et al. |
| 7,221,313 | B2 | 5/2007 | Ganguly et al. |
| 7,489,270 | B2 | 2/2009 | Lawrence et al. |
| 8,022,868 | B2 * | 9/2011 | Yudanov et al. ......... 342/357.62 |
| 2006/0244656 | A1 | 11/2006 | Lawrence et al. |
| 2007/0008216 | A1 | 1/2007 | Ganguly et al. |

FOREIGN PATENT DOCUMENTS

EP    1031845 A2    8/2000

OTHER PUBLICATIONS

Extended European Search Report received for European Patent Application No. 09180189.4, mailed on Dec. 23, 2011, 6 pages.
Neumann et al., "GLONASS Receiver Inter-Frequency Biases—Calibration Methods and Feasibility", ION GPS '99, Nashville, Tennessee, Sep. 14-17, 1999, pp. 329-337.

(Continued)

*Primary Examiner* — Tashiana Adams
*Assistant Examiner* — Fred H Mull
(74) *Attorney, Agent, or Firm* — Morrison & Foerster LLP (57) ABSTRACT

Dynamic inter-channel bias calibration of a navigational receiver is provided. A reference signal is propagated through front-end circuitry of the receiver. A delay caused by the propagation of the reference signal through the front-end circuitry is measured. The inter-channel bias of the navigational receiver is reduced using the measured delay associated with the front-end circuitry of the receiver.

6 Claims, 4 Drawing Sheets

(56) References Cited

OTHER PUBLICATIONS

Non Final Office Action received for U.S. Appl. No. 12/347,218, mailed on Sep. 28, 2010, 8 pages.

Notice of Allowance received for U.S. Appl. No. 12/347,218, mailed on May 18, 2011, 5 pages.

* cited by examiner

INTER-CHANNEL BIAS CALIBRATION FOR NAVIGATION SATELLITE SYSTEMS

CROSS REFERENCE TO RELATED APPLICATIONS

This application is a Continuation-in-Part of U.S. patent application Ser. No. 13/234,034, filed Sep. 15, 2011, which is a Continuation of U.S. patent application Ser. No. 12/347,218 (now U.S. Pat. No. 8,022,868), filed Dec. 31, 2008, the disclosures of which are incorporated herein by reference in their entirety.

BACKGROUND

1. Field

The present disclosure relates to calibration of inter-channel bias in navigation satellite systems.

2. Related Art

Navigation receivers that utilize the signals of the global navigation satellite systems GPS and GLONASS enable various positioning tasks with very high accuracy. A GPS or GLONASS receiver receives and processes radio signals transmitted by the navigation satellites. The satellite signals are carrier harmonic signals that are modulated by pseudo-random binary codes which, on the receiver side, are used to measure the delay relative to a local reference clock. These delay measurements are used to determine the so-called pseudo-ranges between the receiver and the satellites. The pseudo-ranges are different from the true geometric ranges because the receiver's local clock is different from the satellite onboard clocks. If the number of satellites in sight is greater than or equal to four, then the measured pseudo-ranges can be processed to determine the user's single point location $X=(x, y, z)^T$ (all vectors are represented as columns; the symbol $^T$ denotes matrix/vector transpose), as well as compensate for the receiver clock offset.

The necessity to improve positioning accuracies has eventually led to the development of "differential navigation/positioning." In this mode, the user position is determined relative to the antenna connected to a Base receiver, assuming that the coordinates of the Base are known with high accuracy. The Base receiver will transmit its measurements (or corrections to the full measurements) to a mobile navigation receiver ("Rover"). The Rover receiver will use these corrections to refine its own measurements in the course of data processing. The rationale for this approach is that since most of the pseudo-range and pseudo-phase measurement errors on the Base and Rover sides are strongly correlated, using differential measurements will substantially improve the positioning accuracy.

The fundamental task of a GPS or GLONASS receiver is to measure distances to several GPS or GLONASS satellites and compute receiver coordinates. Distances are measured to satellites by measuring the travel time of signals from the satellites to the core of the receiver electronics where the received signals are processed. Data used from a Base receiver (at a known point) removes common errors in the Rover and yields accurate results. The signal path from each satellite to the receiver electronics consists of two parts: 1) the direct path in space from the satellite to the receiver antenna, and 2) from the receiver antenna to the receiver electronics. The first path is unique to each satellite. The second path is common for all satellites, and is where the signal travels through antenna electronics, antenna cable, and to the analog and digital sections of the receiver. The signal travel time through the second path is referred to as the "receiver bias." As long as the receiver bias is the same for all satellites, it acts as a component of the receiver clock offset, which we solve as the fourth unknown (along with x, y, z). In other words, if the receiver bias is the same for all satellites it does not impact position computations.

However, the receiver biases for all GLONASS receivers are not the same. The reason is that the receiver bias, or group delay, depends on the satellite signal frequency and that GLONASS satellites transmit on different frequencies. As a result, each GLONASS satellite generates a different receiver bias. In technical terminology, GLONASS satellites cause inter-channel biases which, if not taken into account, can significantly degrade position accuracy. Fortunately, all common errors between the Base and the Rover receivers are cancelled. Therefore, if the magnitudes of the GLONASS inter-channel biases in the Base receiver and in the Rover receiver are the same, these biases will be cancelled and they will not degrade the position accuracy. However, this rarely happens. This is due to the fact that the magnitudes of the inter-channel biases depend not only on the receiver design and its electronic components, but also on the temperature and slight variations in the electronic components. Even in the best case where the Base and the Rover receivers are from the same manufacturer and have identical design, components, and manufacturing dates, there is still the issue of temperature and minute component differences. The magnitude of the GLONASS inter-channel biases can prohibit the use of GLONASS satellites for precision applications.

While GPS satellites transmit on the same frequency, the receiver biases generated by the satellites may still be different. This may occur due to slight differences in the frequencies of the satellite signals caused by different Doppler shifts as the satellites orbit around Earth. In some examples, a frequency difference of up to 10 KHz may result from the different Doppler shifts. Additionally, similar to GLONASS receivers, the inter-channel bias of a GPS receiver depends on temperature and slight variations in electronic components.

When the objective is to achieve centimeter and sub-centimeter accuracy, dealing with GPS and GLONASS inter-channel biases is not an easy task. Currently, some manufacturers simply ignore the inter-channel biases. When the inter-channel biases are noticeable, one solution is to use GPS and GLONASS to resolve ambiguities, and then ignore one of the GPS or GLONASS measurements or significantly de-weight them. Dealing with the problem in this manner does not allow the user to know why their GPS+GLONASS receiver does not show any improvement over GPS-only or GLONASS-only receivers. When the receiver firmware cannot isolate the GPS or GLONASS satellites with high inter-channel biases it provides inaccurate results. This is a serious problem that causes the user to accept faulty results. Other manufacturers try to measure the GPS or GLONASS inter-channel biases in a sample of pre-production receivers and hardcode these biases into the firmware. This is a positive step forward but by no means can cure the problem because there are still differences between electronic components compared to the sample, and their characteristics vary by temperature and time.

Thus, a solution is needed to dynamically account for and calibrate receiver specific inter-channel biases.

BRIEF SUMMARY

Embodiments of the present technology are directed to calibrating GPS and GLONASS inter-channel biases. An embodiment generates a reference signal comprising a pseudo-noise component and measures a bias delay associated with front-end circuitry of a navigation receiver by comparing a pseudo-noise component of a delayed reference signal with the pseudo-noise component of the reference signal. The delayed reference signal is based upon propagation of the reference signal through the front-end circuitry of the navigation receiver. The front-end circuitry processes the reference signal and a received satellite signal. A calibration module generates a correction signal to reduce inter-channel bias. In another embodiment, a microprocessor may generate the correction signal.

In some examples, the navigation receiver is a GLONASS receiver. In other examples, the navigation receiver is a GPS receiver. In yet other examples, the navigation receiver is a combined GPS and GLONASS receiver.

In some examples, the received satellite signal includes time data. In these examples, the navigation receiver may be operable to decode the received satellite signal to determine a time represented by the time data.

In some examples, the front-end circuitry includes a receiver antenna. In these examples, the reference signal circuitry is coupled to transmit the reference signal through the receiver antenna. In other examples, the front-end circuitry includes a filter.

Many of the techniques described here may be implemented in hardware, firmware, software, or combinations thereof. In one example, the techniques are implemented in computer programs executing on programmable computers that each includes a processor, a storage medium readable by the processor (including volatile memory, nonvolatile memory or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

DETAILED DESCRIPTION

The following description is presented to enable a person of ordinary skill in the art to make and use the various embodiments, and is provided in the context of particular applications and their requirements. Various modifications to the embodiments will be readily apparent to those skilled in the art, and the generic principles defined herein may be applied to other embodiments and applications without departing from the spirit and scope of the present technology. Moreover, in the following description, numerous details are set forth for the purpose of explanation. However, one of ordinary skill in the art will realize that the various embodiments might be practiced without the use of these specific details. In other instances, well-known structures and devices are shown in block diagram form in order not to obscure the description of the various embodiments with unnecessary detail. Thus, the present technology is not intended to be limited to the embodiments shown, but is to be accorded the widest scope consistent with the principles and features disclosed herein.

While the present technology is described in terms of particular examples and illustrative figures, those of ordinary skill in the art will recognize that the present technology is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic or an appropriate combination thereof, as would be recognized by one skilled in the art to carry out the recited functions.) Software and firmware can be stored on non-transitory computer-readable storage media. Some other processes can be implemented using analog circuitry, as is well known to one of ordinary skill in the art. Additionally, memory or other storage, as well as communication components, may be employed in embodiments of the various embodiments.

Figure 1:
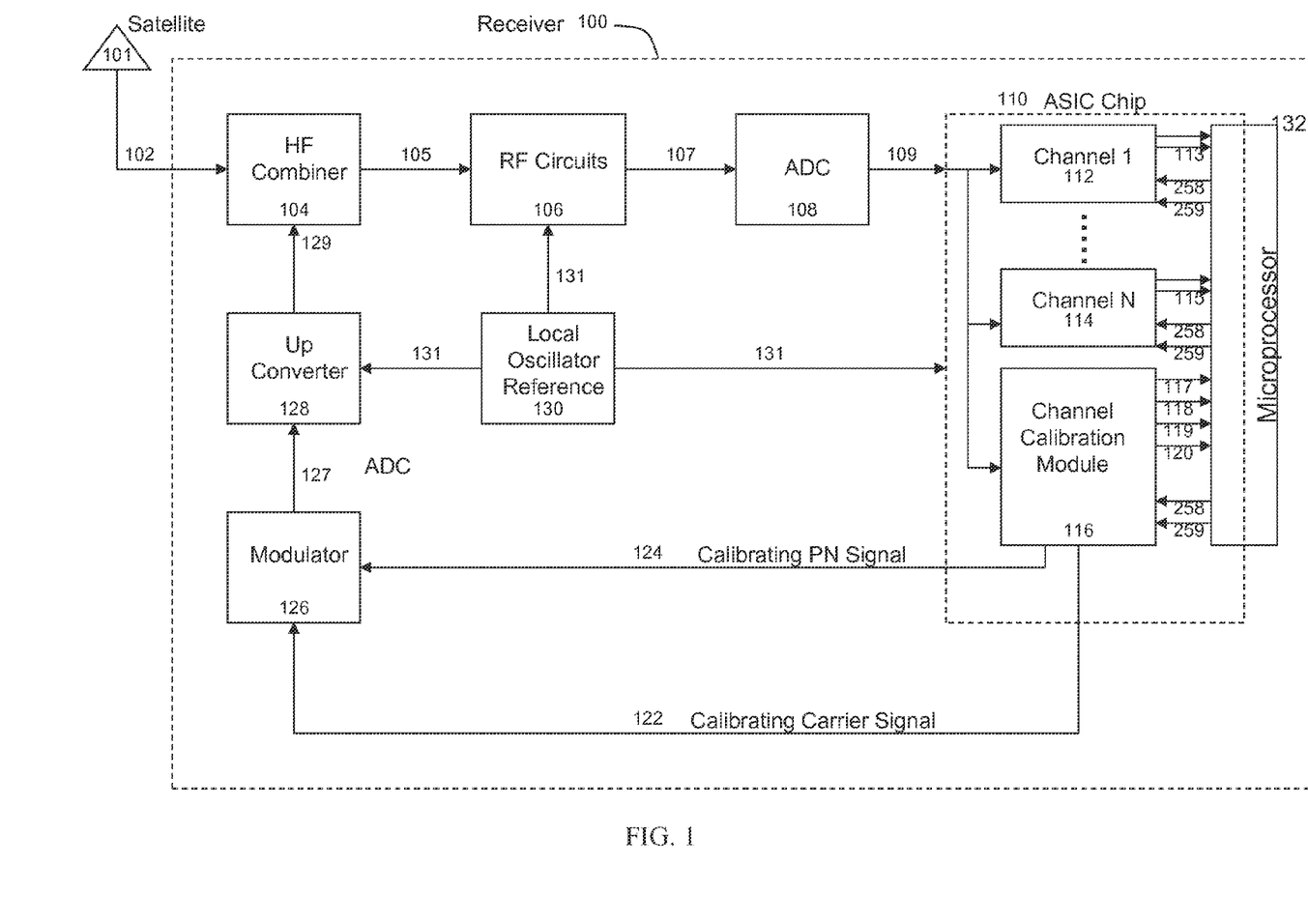
FIG. 1 illustrates a schematic diagram of an exemplary inter-channel bias calibrating receiver.

FIG. 1 illustrates a typical configuration of an inter-channel bias calibrating receiver 100 according to embodiments disclosed herein. In some examples, inter-channel bias calibrating receiver 100 may be used to receive GPS signals while, in other examples, inter-channel bias calibration receiver 100 may be used to receive GLONASS signals. In one example, inter-channel bias calibrating receiver 100 receives signal 102 from satellite 101. Signal 102 may be a GPS signal or a GLONASS signal and may contain two pseudo-noise ("PN") code components, a coarse code and precision code residing on orthogonal carrier components, which may be used by calibrating receiver 100 to determine the position of the receiver. For example, a typical signal 102 will be comprised of a carrier signal modulated by two PN code components. In some examples, for GLONASS systems, the frequency of the carrier signal may be satellite specific, thus each GLONASS satellite may transmit a GLONASS signal at a different frequency. In other examples, for GPS systems, the frequency of the carrier signal may be the same for all satellites. However, the frequency of signals 102 received from different GPS satellites may be slightly different due to different Doppler shifts as each satellite orbits Earth. The frequency difference caused by the different Doppler shifts can be as high as 10 KHz or more.

Inter-channel bias calibrating receiver 100 may also contain high frequency combiner 104. High frequency combiner 104 acts as an adder to combine two or more signals. In one example, high frequency combiner 104 receives signal 102 along with calibration signal 129, and combines them to create combined signal 105.

Inter-channel bias calibrating receiver 100 may also include RF circuitry 106. In one example, RF circuitry 106 modifies the incoming analog combined signal 105 to one which can be processed by an analog to digital converter and, thereafter, satellite signal detection circuitry to detect the satellite signal that has been received. The RF circuitry 106 may include, for example, filters, amplifiers, and down converters to convert the incoming signal to baseband. It should be understood that the down converters may instead convert to an intermediate frequency depending on the entire receiver frequency plan design and available electronic components.

Those skilled in the art will recognize that additional circuitry may also be included to appropriately modify the analog signal.

In some examples, as mentioned above, RF circuits 106 may include one or more filters to reduce interference caused by signals having frequencies close to that of GPS or GLONASS signal 102. For example, other navigation systems may generate signals having frequencies that would otherwise interfere with signal 102 without the filter. With conventional receivers, a filter producing a uniform receiver bias for all channels must be used or else the receiver may experience a reduction in performance. However, designing a filter that produces a uniform receiver bias across a wide range of frequencies can be difficult. With inter-channel bias calibrating receiver 100, however, the filter need not produce the same receiver bias for each channel because the receiver compensates for different receiver biases. This allows receiver 100 to be used with a wider range of filters without experiencing a reduction in performance caused by the selected filter.

RF circuitry 106 produces RF circuit output signal 107 which is converted by analog to digital converter ("ADC") 108 into ADC signal 109, a digital signal. ADC signal 109 is a digital signal generated by sampling multiple repetitions of RF circuit output signal 107. The spectrum of the digital signal may contain an image of the analog signal in baseband, but further digital processing depends on the receiver architecture. For example, the receiver may convert one of the multiple digital spectrum images into baseband or process the baseband image itself.

Inter-channel bias calibrating receiver 100 may also include multiple GPS or GLONASS channels, such as channels 112 and 114. It should be understood that any number of channels may be provided. Channels 112 and 114 may each contain a demodulator to demodulate a PN code contained in ADC signal 109, a PN code reference generator, a numerically controlled oscillator (code NCO) to drive the PN code generator as well as a carrier frequency demodulator (e.g. a phase detector of a phase locked loop—PLL), and a numerically controlled oscillator to form a reference carrier frequency and phase (carrier NCO). In one example, the numerically controlled oscillator (code NCO) of channels 112 and 114 may receive code frequency/phase control signal 258 as input. Further, the numerically controlled oscillator (carrier NCO) of channels 112 and 114 may receive carrier frequency/phase control signal 259 as input. Code frequency/phase control signal 258 and carrier frequency/phase control signal 259 are described in greater detail below.

In one example, the GPS or GLONASS channels may reside in an application specific integrated circuit ("ASIC") chip 110. When a corresponding code or frequency is detected, the appropriate GPS or GLONASS channel may use the embedded PN code to determine the distance of the receiver from the satellite. This information may be provided by channels 112 and 114 through channel output vectors 113 and 115, respectively. Channel output vectors 113 and 115 each contain four signals forming two vectors—inphase I and quadriphase Q which are averaged signals of the phase loop discriminator (demodulator) output, and inphase dI and quadriphase dQ—averaged signals of the code loop discriminator (demodulator) output.

ASIC chip 110 may also contain channel calibration module 116. In one example, channel calibration module 116 may receive ADC signal 109 which contains the GPS or GLONASS satellite signals down-converted, for example, to intermediate frequencies. In one example, for GLONASS systems, the channel calibration module 116 may be tunable to any of the down-converted intermediate frequencies corresponding to the GLONASS satellite frequencies. In other examples, for GPS systems, the channel calibration module 116 may be configured to identify any of the codes associated with the GPS satellites. It should be understood by those skilled in the art that channel calibration module 116 may include any number of channel inputs to monitor the various GPS or GLONASS channels. For example, there may be a channel input dedicated to each GPS or GLONASS channel, thus eliminating the need for channel calibration module 116 to be tunable to any of the GLONASS channel frequencies or to be configured to detect the codes associated with the different GPS satellites.

Channel calibration module 116 may further include circuitry for generating a calibrating carrier signal 122 and a reference signal (e.g. calibrating PN signal 124). Carrier signal 122 is a carrier signal to be modulated by calibrating PN signal 124 at a frequency corresponding to the channel that calibration module 116 is calibrating. The modulated carrier signal 122 is a calibration signal which imitates the ranging signal of a GPS or GLONASS satellite as if it were operating with the same time clock as the receiver. Thus, the "satellite" signal (modulated carrier signal 122) transmission time is known at the receiver by calculating the difference in code delay and phase shift between the received calibration signal and the transmitted calibration signal.

In one example, the calibrating PN signal 124 is separable from the PN signal component contained within signal 102. For example, the calibrating PN signal 124 may be orthogonal to the PN signal component of signal 102. It should be understood by one of ordinary skill in the art that the reference signal (e.g., calibrating PN signal 124) normally refers to the baseband signal, but as it passes through the front-end circuitry, it refers to the reference signal up-converted to a frequency matching that of the satellite signal.

In one example, calibrating PN signal 124 is sent through front-end circuitry of the receiver, wherein front-end circuitry of the receiver refers to the circuitry of the receiver between the antenna and the GPS or GLONASS channel receiver. In one example, the front-end circuitry is comprised of high frequency combiner 104, GLONASS RF circuits 106, and ADC 108. In another example, the front-end circuitry may further include the antenna of receiver 100. Thus, in this example, the calibrating PN signal 124 may be injected at the distal end of the antenna or at any point along the antenna of receiver 100. In yet another example, the front-end circuitry may include any portion or all of receiver 100 to measure the receiver bias caused by those portions of the receiver. Those skilled in the art will recognize that front-end circuitry may be comprised of additional or fewer components depending on various receiver electronic component configurations.

In one example, calibration module 116 may sequentially rotate through each of the channels in order to ensure continued calibration of each channel. For instance, calibration module 116 may switch the calibrating channel after a predetermined length of time in order to account for changes in receiver bias over time. In another example, calibration module 116 may switch channels based on user selection.

Channel calibration module 116 may also determine the inter-channel bias of the receiver due to the varying frequencies of the different GLONASS channels or due to the slight difference in frequencies of the GPS channels caused by different Doppler shifts as the GPS satellites orbit around Earth. Channel calibration module 116 accomplishes this by comparing the received calibrating PN signal 124 embedded within ADC signal 109, with its internal PN signal. Channel calibration module 116 may also generate output vectors contained within calibration module output signals 117-120. Calibration module output signals 117-120 are similar to channel output vectors 113 and 115 as they contain four signals forming two vectors—inphase I, quadriphase Q, inphase dI, and quadriphase dQ.

Calibration module output signals 117-120 may be sent to microprocessor 132 which may use these signals to reduce the inter-channel bias by adjusting the range and phase determined by the various GPS or GLONASS channels. It should be understood by one of ordinary skill in the art that reduce can mean completely or partially eliminate the inter-channel bias. Using calibration module output signals 117-120, the microprocessor 132 can calculate range and phase corrections using the following equations:

$$\Delta P = \arctan \frac{Q_{C(1-N)}}{I_{C(1-N)}} \qquad 1.1$$

$$\Delta R = K \frac{I_{C(1-N)} dI_{C(1-N)} + Q_{C(1-N)} dQ_{C(1-N)}}{I_{C(1-N)}^2 + Q_{C(1-N)}^2} \qquad 2.1$$

Figure 2:
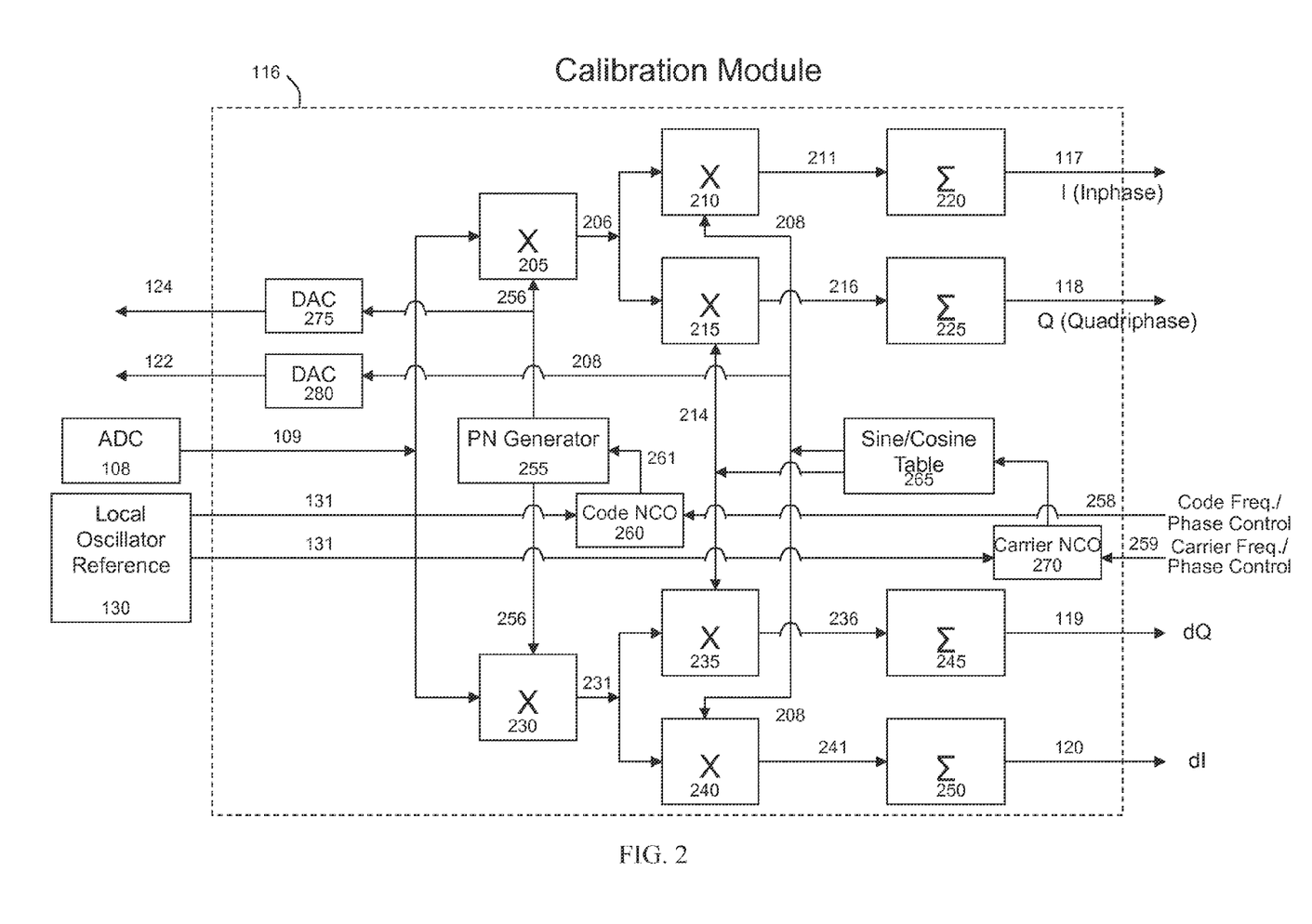
FIG. 2 illustrates a schematic diagram of an exemplary calibration module.

In the above equations, $\Delta P$ represents the phase correction component and $\Delta R$ represents the range correction component of the correction signals generated by microprocessor 132. Q is the quadriphase signal and I is the inphase signal, which are averaged signals of the phase loop discriminator (demodulator) output generated by channel calibration module 116. dI is the inphase signal and dQ is the quadriphase signal, which are averaged signals of the code loop discriminator (demodulator) output generated by channel calibration module 116. The subscript "$_C$" indicates that these signals are received from channel calibration module 116. The subscript "$_{(1-N)}$" denotes the channel number (e.g., $Q_{C(3)}$ is the quadriphase signal output from channel 3 of calibration module 116) corresponding to the signal, where channel calibration module 116 contains N channels. "Arc" is an abbreviation for the trigonometric function, arctangent. K is a scaling factor coefficient which may be used to account for differences in the gain of adders 220, 225, 245, and 250. Letting L be the gain of adders 220 and 225 and letting M be the gain of adders 245 and 250 results in a scaling factor coefficient of K=L/M. The scaling factor ensures direct proportionality between dI and $\Delta R$.

As discussed above, channel calibration module 116 may contain the same or a different number of channels than receiver 100. Thus, with respect to receiver 100, N may represent the number of channels in receiver 100 rather than the number of channels in calibration module 116.

In one example, equation 1.1 is used by microprocessor 132 to generate code frequency/phase control signal 258. Microprocessor 132 may also use equation 2.1 to generate carrier frequency/phase control signal 259. As used herein, "correction signal" refers to code frequency/phase control signal 258 and carrier frequency/phase control signal 259. While channels 112 and 114 are shown receiving the same code frequency/phase control signal 258 and carrier frequency/phase control signal 259, it should be appreciated by one of ordinary skill in the art that each channel may receive correction signals that are specific for that channel. For example, channel 112 may receive correction signals that are generated while calibration module 116 is tuned to the code or frequency of channel 112. Also, when calibration module 116 is later tuned to the code or frequency of channel 114, channel 112 may continue to receive the same correction signals that were received while calibration module 116 was previously tuned to the code or frequency of channel 112. Further, channel 114 may receive the correction signals that are generated while calibration module 116 is tuned to channel 114.

In tracking mode, the above equations may be simplified using an approximation due to the fact that generally Q<<I. The simplified equations are:

$$\Delta P = \frac{Q_{C(1-N)}}{I_{C(1-N)}} \qquad 1.2$$

$$\Delta R = K \frac{dI_{C(1-N)}}{I_{C(1-N)}} \qquad 2.2$$

In FIG. 1, microprocessor 132 is depicted overlaying the border of ASIC 110. It should be understood that microprocessor 132 may be a separate unit from ASIC 110 or may alternatively be embedded within ASIC 110. In one example, the above computations are executed in microprocessor 132. In another example, the above computations may alternatively be performed in ASIC 110.

Inter-channel bias calibrating receiver 100 may also contain modulator 126. Modulator 126 may generate modulated signal 127 by modulating calibrating carrier signal 122 with calibrating PN signal 124.

Inter-channel bias calibrating receiver 100 may also contain up converter 128. Up converter 128 may convert the frequency of modulated signal 127 to the frequency of signal 102. In one example, modulated signal 127 is sent to up converter 128 where the frequency of the signal is increased to match that of signal 102. The up-converted signal is calibration signal 129. Calibration signal 129 may be sent to high frequency combiner 104 where it is combined with signal 102 to create combined signal 105. Calibrating signal 129 provides a reference PN code imposed on a corresponding GPS or GLONASS carrier frequency to be used by calibration unit 116 to determine code (group) delay and carrier phase shift caused by the front-end circuitry or any other portion of receiver 100. As mentioned above, it should be appreciated that calibration signal 129 can be sent to any portion of receiver 100 to measure the receiver bias caused by that portion of receiver 100.

Inter-channel bias calibrating receiver 100 may also contain local oscillator reference 130. Local oscillator reference 130 may generate oscillator reference signal 131. In one example, oscillator reference signal 131 may be sent to up converter 128, RF circuitry 106, and ASIC chip 110. It should be understood by those skilled in the relevant art that oscillator reference signal 131 may be sent to other components of the inter-channel bias calibrating receiver 100 that require an oscillator reference. In one example, local oscillator reference 130 generates a stable reference frequency required by all RF circuitries for frequency conversions and provides the reference clock for digital processing in ASIC and receiver time counting.

While inter-channel bias calibrating receiver 100 is described above with respect to determining position, inter-channel bias calibrating receiver 100 may also be used for timing applications. For example, in GPS systems, the GPS satellites may contain multiple atomic clocks that contribute precise time data to the GPS signals 102. The GPS receiver 100 may decode the signal 102 to determine the precise time without having an atomic clock of its own. Delays through the circuitry of receiver 100 caused by GPS signals having slightly different frequencies due to different Doppler shifts may result in inaccurate time measurements. Thus, the inter-channel bias calibration performed by inter-channel bias calibrating receiver 100 may not only improve position measurements, but may also be used to improve time measurements as well.

FIG. 2 illustrates an exemplary schematic diagram of calibration module 116. In one example, calibration module 116 generates a reference signal to be propagated through the front-end circuitry of inter-channel bias calibrating receiver 100. Calibration module 116 may also measure a delay associated with the front-end circuitry or any other portion of receiver 100 by comparing the delayed reference signal with the sent reference signal. Calibration module 116 may use the measured delay to reduce the inter-channel bias of the receiver associated with the front-end circuitry or any other portion of receiver 100.

In one example, calibration module 116 receives ADC signal 109 which may be sent to digital multipliers 205 and 230. Digital multipliers 205 and 230 multiply ADC signal 109 with PN code signal 256 to generate correlator signal 206 and discriminator signal 231, respectively. Correlator signal 206 represents the correlation between the incoming GPS or GLONASS signal and the reference signal generated by PN generator 255. Discriminator signal 231 represents the misalignment (error) between the incoming PN code embedded within ADC signal 109 and the reference PN code generated by PN generator 255.

In one example, correlator signal 206 may be sent to digital multiplier 210 and 215. Digital multiplier 210 multiplies correlator signal 206 with sine signal 208 to generate signal 211. Signal 211 is then sent to adder 220, an accumulating adder, meaning it adds the incoming sequence of numbers to previously stored values from previous clock cycles. Thus, adder 220 acts as a digital filter on the correlator structure, averaging the incoming signal over a period of time. In one example, the period of time may be 1 ms. The output of adder 220 is calibration module output signal 117 which is the I (Inphase) component of the calibration module output signal sent to microprocessor 132.

In one example, correlator signal 206 is also sent to digital multiplier 215. Digital multiplier 215 multiplies correlator signal 206 with cosine signal 214 to generate signal 216. Signal 216 is then sent to adder 225, an accumulating adder, adding the incoming sequence of numbers to previously stored values from previous clock cycles. Thus, adder 225 acts as a digital filter on the correlator structure, averaging the incoming signal over a period of time. In one example, the period of time may be 1 ms. The output of adder 225 is calibration module output signal 118 which is the Q (Quadriphase) component of the calibration module output signal sent to microprocessor 132.

In one example, discriminator signal 231 may be sent to digital multiplier 235 and 240. Digital multiplier 235 multiplies discriminator signal 231 with cosine signal 214 to generate signal 236. Signal 236 is then sent to adder 245, an accumulating adder, meaning it adds the incoming sequence of numbers to previously stored values from previous clock cycles. Thus, adder 245 acts as a digital filter on the discriminator structure, averaging the incoming signal over a period of time. In one example, the period of time may be 1 ms. The output of adder 245 is calibration module output signal 119 which is the dQ (derivative of Quadriphase) component of the calibration module output signal sent to microprocessor 132.

In one example, discriminator signal 231 is also sent to digital multiplier 240. Digital multiplier 240 multiplies discriminator signal 231 with sine signal 208 to generate signal 241. Signal 241 is then sent to adder 250, an accumulating adder, adding the incoming sequence of numbers to previously stored values from previous clock cycles. Thus, adder 250 acts as a digital filter on the discriminator structure, averaging the incoming signal over a period of time. In one example, the period of time may be 1 ms. The output of adder 250 is calibration module output signal 120 which is the dI (derivative of Iphase) component of the calibration module output signal sent to microprocessor 132.

In one example, calibration module 116 may also receive oscillator reference signal 131 as an input. Oscillator reference signal 131 may be sent to code NCO 260. Code NCO 260 receives oscillator reference signal 131 and code frequency/phase control signal 258. Code frequency/phase control signal 258 is generated by microprocessor 132 using calibration module output signals 117-120 and equation 2.1 listed above. Code NCO 260 uses oscillator reference signal 131 and code frequency/phase control signal 258 to generate code NCO signal 261 to drive PN generator 255. PN generator uses NCO signal 261 to create PN code signal 256.

In one example, Oscillator reference signal 131 may also be sent to numerically controlled oscillator 270 (carrier NCO). Carrier NCO 270 receives oscillator reference 131 and carrier frequency/phase control signal 259. Carrier frequency/phase control signal 259 is generated by microprocessor 231 using calibration module output signals 117-120 and equation 1.1 listed above. Carrier NCO 270 uses oscillator reference signal 131 and carrier frequency/phase control signal 259 to generate carrier NCO signal 258. Carrier NCO signal 258 is sent to sine/cosine table 265 to generate a reference carrier signal with a desired frequency and phase. Sine/cosine table 265 generates sine signal 208 and cosine signal 214.

In one example, calibration module 116 may also include digital to analog converters (DAC) 275 and 280. DAC 275 receives PN code signal 256 from PN generator 255. DAC 275 converts the digital input signal into calibrating PN signal 124, an analog signal. Likewise, DAC 280 receives digital sine signal 208 and converts it into calibrating carrier signal 122, an analog signal.

Figure 3:
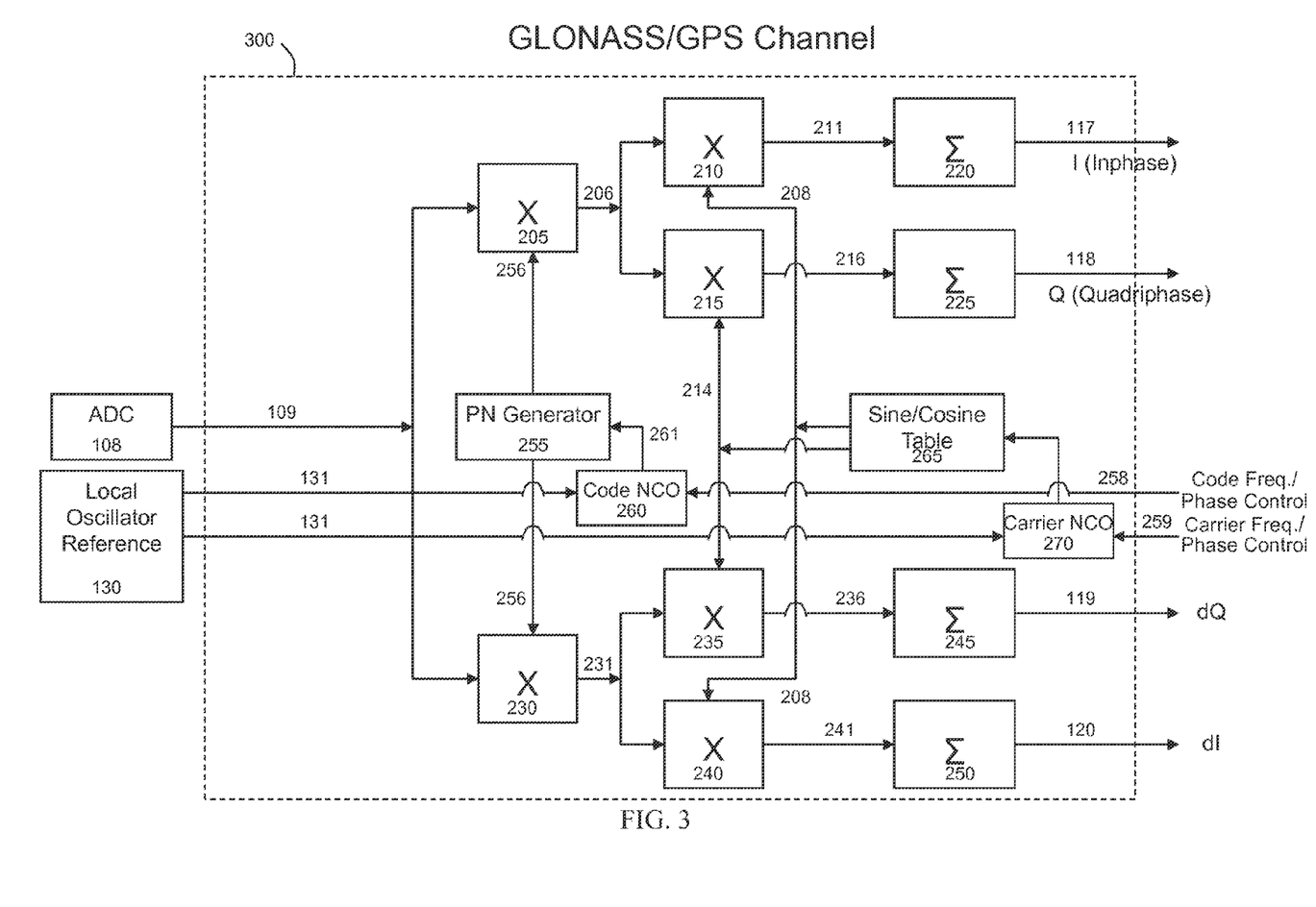
FIG. 3 illustrates a schematic diagram of an exemplary GLONASS/GPS channel.

FIG. 3 illustrates a schematic diagram of an exemplary GPS or GLONASS channel. In one example, channels 112 and 114 are represented by the schematic diagram illustrated by FIG. 3. The schematic diagram of FIG. 3 is identical to that of FIG. 2 with the exception that FIG. 3 does not contain DAC 275 and 280 and their respective input and output signals.

Figure 4:
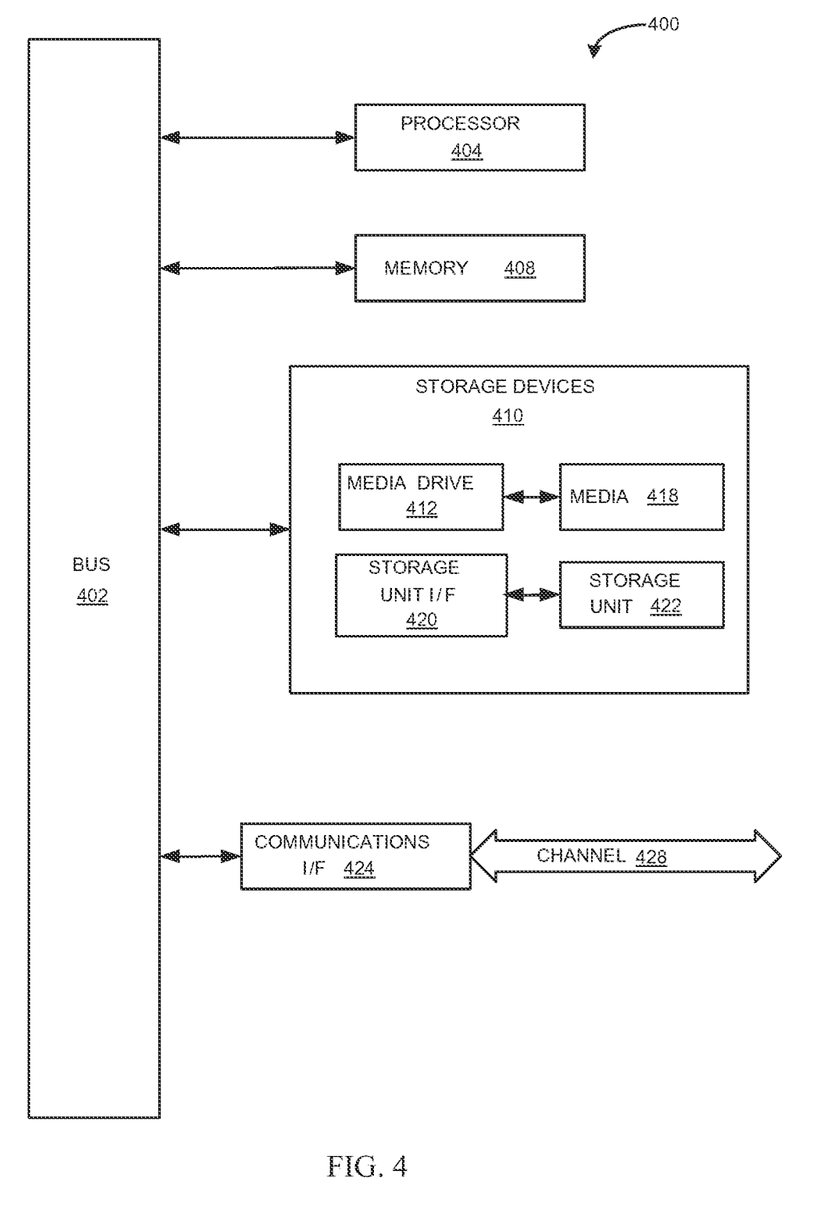
FIG. 4 illustrates a typical computing system that may be employed to implement some or all processing functionality in certain embodiments.

FIG. 4 illustrates a typical computing system 400 that may be employed to implement processing functionality in the disclosed embodiments. Computing systems of this type may be used in clients and servers, for example. Those skilled in the relevant art will also recognize how to implement the various embodiments using other computer systems or architectures. Computing system 400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 400 can include one or more processors, such as a processor 404. Processor 404 can be implemented using a general or special purpose processing engine such as, for example, a microprocessor, microcontroller or other control logic. In this example, processor 404 is connected to a bus 402 or other communication medium.

Computing system 400 may also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory ("ROM") or other static storage device coupled to bus 402 for storing static information and instructions for processor 404.

The computing system 400 may also include information storage system 410, which may include, for example, a media drive 412 and a removable storage interface 420. The media drive 412 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 418, may include, for example, a hard disk, floppy disk, magnetic tape, optical disk, CD or DVD, or other fixed or removable medium that is read by and written to by media drive 412. As these examples illustrate, the storage media 418 may include a computer-readable storage medium having stored therein particular computer software or data.

In alternative embodiments, information storage system 410 may include other similar components for allowing computer programs or other instructions or data to be loaded into computing system 400. Such components may include, for example, a removable storage unit 422 and an interface 420, such as a program cartridge and cartridge interface, a removable memory (for example, a flash memory or other removable memory module) and memory slot, and other removable storage units 422 and interfaces 420 that allow software and data to be transferred from the removable storage unit 418 to computing system 400.

Computing system 400 may also include a communications interface 424. Communications interface 424 can be used to allow software and data to be transferred between computing system 400 and external devices. Examples of communications interface 424 can include a modem, a network interface (such as an Ethernet or other NIC card), a communications port (such as for example, a USB port), a PCMCIA slot and card, etc. Software and data transferred via communications interface 424 are in the form of signals which can be electronic, electromagnetic, optical or other signals capable of being received by communications interface 424. These signals are provided to communications interface 424 via a channel 428. This channel 428 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "non-transitory computer-readable storage medium" and the like may be used generally to refer to physical, tangible media such as, for example, memory 408, storage media 418, or storage unit 422. These and other forms of computer-readable storage media may be involved in storing one or more instructions for use by processor 404, to cause the processor to perform specified operations. Such instructions, generally referred to as "computer program code" (which may be grouped in the form of computer programs or other groupings), when executed, enable the computing system 400 to perform features or functions of the disclosed embodiments. Note that the code may directly cause the processor to perform specified operations, be compiled to do so, or be combined with other software, hardware, or firmware elements (e.g., libraries for performing standard functions) to do so.

In an embodiment where the elements are implemented using software, the software may be stored in a non-transitory computer-readable storage medium and loaded into computing system 400 using, for example, removable storage media 418, drive 412, or communications interface 424. The control logic (in this example, software instructions or computer program code), when executed by the processor 404, causes the processor 404 to perform the functions of the various embodiments as described herein.

It will be appreciated that the above description for clarity has described embodiments of the present technology with reference to different functional units. However, it will be apparent that any suitable distribution of functionality between different functional units may be used without detracting from the present technology. Hence, references to specific functional units are only to be seen as references to suitable means for providing the described functionality rather than indicative of a strict logical or physical structure or organization.

The various embodiments can be implemented in any suitable form including hardware, software, firmware or any combination thereof. Different aspects of the various embodiments may be implemented at least partly as computer software or firmware running on one or more data processors or digital signal processors. The elements and components of an embodiment of the present technology may be physically, functionally and logically implemented in any suitable way. Indeed the functionality may be implemented in a single unit, in a plurality of units or as part of other functional units. As such, the various embodiments may be implemented in a single unit or may be physically and functionally distributed between different units and processors.

Although the present technology has been described in connection with some embodiments, it is not intended to be limited to the specific form set forth herein. Rather, the scope of the present technology is limited only by the claims. Additionally, although a feature may appear to be described in connection with a particular embodiment, one skilled in the art would recognize that various features of the described embodiments may be combined in accordance with the present technology. Moreover, aspects of the present technology describe in connection with an embodiment may stand alone.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the present technology. The present technology is not to be limited by the foregoing illustrative details, but is to be defined according to the claims.

What is claimed is:

1. A method for calibrating an inter-channel bias of a navigation receiver, comprising:
generating a reference signal comprising a pseudo-noise component;
measuring a bias delay associated with front-end circuitry of the navigation receiver by comparing a pseudo-noise component of a delayed reference signal with the pseudo-noise component of the reference signal, wherein the delayed reference signal is based upon propagation of the reference signal through the front-end circuitry of the navigation receiver, the front-end circuitry for processing the reference signal and a received satellite signal, wherein the front-end circuitry includes a filter; and generating a correction signal to reduce inter-channel bias.

2. The method of claim 1, wherein the navigation receiver is a GLONASS receiver.

3. The method of claim 1, wherein the navigation receiver is a GPS receiver.

4. The method of claim 1, wherein the navigation receiver is a combined GPS and GLONASS receiver.

5. The method of claim 1, wherein the received satellite signal comprises time data, and wherein the navigation receiver is operable to decode the received satellite signal to determine a time represented by the time data.

6. The method of claim 1, wherein the front-end circuitry comprises a receiver antenna, and wherein the reference signal circuitry is coupled to transmit the reference signal through the receiver antenna.

\* \* \* \* \*